Patented July 21, 1953

2,646,351

UNITED STATES PATENT OFFICE 2,646,351

PROCESS OF MANUFACTURING BASIC STEEL

Karl Heimberg, Mulheim (Ruhr), Germany, assignor to Compagnie Generale des Conduites d'Eau, Les Vennes-Liege, Belgium No Drawing. Application July 27, 1951, Serial No. 238,998. In Germany July 31, 1950

6 Claims. (Cl. 75—46)

This process relates to a novel process of making basic or Thomas steel by charging a remelted pig iron, treated according to certain specified conditions in a cupola, into a Thomas converter.

The art has, for many years, sought to develop an economical Thomas process, this economy being essentially dependent on the temperature of the pig iron with which the Thomas converter is charged. The advantages of utilizing a very fluid basic pig iron at high temperatures in the Thomas converter are well-known in the art. These advantages are enumerated below:

1. Shorter periods of operation,
2. Smaller losses,
3. Less excrescence at the tap hole.
4. An increase in the quantity of cooling scrap,
5. A higher output, and other metallurgical advantages. Although these advantages are well-known, the development of such an economical process has not been attained. However, where the composition of the mixture bed permits, an attempt was made to achieve a process possessing the above advantages, by working with a basic slag and in using more coke to obtain an ideal Thomas pig iron with a low percentage of silica and having a high temperature. This attempt has proved unsuccessful because of the difficulties encountered in the furnace when working with a basic slag, which causes hitches more easily and unfavorably influences the slag in reference to its pouring properties, and causes disturbances in the furnace. Thus, after pouring the molten pig iron, any drop in temperature should be avoided. This can be accomplished by covering the runner, by ample insulation of the ladle, by using covered ladles, etc. Similarly, the temperature of the fluid charge at the mixer should be maintained as high as possible or even elevated by heating and by suitable means of insulation. Unfortunately, the heating of the mixer only produces an increase in the temperature of about 20 to 30°, the most favorable charge of pig iron attaining a maximum temperature of about 1340° when introduced into the Thomas converter.

Acid-working of ores poor in iron was believed to be an economical process because of the avoidance of the addition of limestone and of manganiferous substances, thereby permitting an undisturbed operation of the furnace, as well as affording a saving in the amount of coke. However, processes developed before and during the war to economically transform acid ores poor in iron into Thomas steel are considered risked solutions in industry, and are presently not utilized as charges for the Thomas converter. Another reason for their failure resides in the fact that all methods of desulphurization either by means of solid or liquid soda, or by other means result in a prohibitive loss in temperature as well as unfavorably influences the blast at the converter. Other difficulties inherent in the use of acid ores poor in iron are the difficulty of removing the slag, losses in iron, the inconvenience of the soda fumes, etc. These difficulties are further increased by inevitable variations in the working of blast furnaces. Unforeseen changes in the composition of the mixture bed or in the quality of the coke of the blast furnace, disturbances in the actual operation of the furnace, overflow of water through the leakages of the tuyères, etc., render it impossible to obtain a proper pig iron of an ideal composition and having good physical properties. Consequently, in order to obtain the best pig iron composition, test pourings were made in the prior art using the mixer with the result that the quality of the iron was spoiled. Test pourings were also made in the form of solidified iron which was remelted, rendering this method uneconomical.

Consequently, applicant has developed a process of providing a pig iron of the most ideal composition, in the most economical form possible, for use in the basic or Thomas steel works. This ideal composition consists of:

3.5–3.8% C
0.2–0.5% Si
0.8–1.2% Mn
1.7–1.9% P
0.04–0.06% S

This ideal pig iron composition is obtained from low grade pig iron and/or steel turnings by adding thereto an excess amount of low quality fuel and subjecting the mixture to a hot blast at a minimum of about 400° C. in a neutral or basic cupola run with a reducing blast while generating gases, with the formation of a relatively large quantity of basic slag. The resultant basic or Thomas pig iron has a pouring temperature in excess of 1400° C., preferably above 1500°–1600° C., or a working temperature of 1,350° C., and preferably above 1400–1500° C. This high temperature fluid pig iron is charged into a Thomas converter directly or through the intermediary of a mixer and refined into Thomas or basic steel.

Accordingly, an object of the invention is the development of a novel process of providing an ideal pig iron composition for the Thomas steel works.

Another object of this invention is the obtention of high temperature pig iron charges for the Thomas or basic converter.

A further object of the present invention is the development of an economical process of producing high quality steel.

Further objects and advantages of the present invention will be apparent from the following description:

It has now been discovered that a high quality steel can be produced economically by charging a Thomas or basic pig iron having a pouring temperature greater than 1400° C. and preferably 1500–1600° C., or a working temperature of about 1,350° C. and preferably 1400–1500° C., into a Thomas converter directly or through the intermediary of a mixer. This high temperature pig iron is produced by adding an excess amount of low quality fuel to a low-grade pig iron and/or steel turnings, and subjecting the mixture to a hot blast at a minimum of about 400° C. in a neutral or basic cupola run with a reducing blast while generating gases and forming a relatively large quantity of basic slag.

By basic slag is meant a slag which contains more of the basic constituents than the normal slag in the acid cupola. More specifically, a basic slag has a $$\frac{CaO + MgO}{SiO_2 + Al_2O_3}$$

value greater than 0.8, and preferably 1 and greater.

The cupola utilized for melting the poor grade pig iron to produce therefrom a high temperature pig iron of the best composition, as defined above, must have a neutral or basic lining of masonry and be able to operate continuously according to requirements. The pig iron in the cupola must be subjected to a hot blast above 400° C., and preferably above 500–600° C., which may be enriched with oxygen, the heating of this blast being capable of being made in a recuperator heated with the exhaust gas from the cupola or in an existing Cowper of a blast furnace. The production of the desired iron ore composition in the cupola must be carried out with the production of a large quantity of basic slag so as to provide the necessary reducing action on the iron ore, thereby producing the best composition of pig iron to be used in the Thomas converter. This cupola must be operated with a charge of coke which exceeds the amount necessary for smelting, while still permitting a reducing operation therein. The fuel utilized herein is preferably of small calibre or value such as cheap coke. The cupola must also be capable of operating as a gas generator, a part of the gases produced during the smelting operation being utilizable through their combustion, to reheat the blast. The walls of the furnace and the tuyères may be cooled by means of water, if necessary.

A cupola meeting the above requirements not only enables the melting of pig irons and turnings, but also effects reductions in the pig iron, and produces increases in the pouring temperature of the material being smelted to about 1500–1600° C. Furthermore, the Thomas or basic pig iron is provided with the necessary alloying elements, particularly manganese and phosphorus, which can be charged into the cupola in the form of ore, oxide or slag, said alloying elements being reduced in the slag and passing therefrom into the material being melted, forming therewith an intimate union. The alloying elements can also be added in the form of a ferro-alloy.

This novel process of remelting, according to the above described invention, is particularly useful in the economical production of Thomas or basic steel, starting with a pig iron having a low percentage manganese and a high percentage of sulfur, obtained in a blast furnace according to acid or super acids melting methods. Thus, a super acid pig iron of the following approximate composition:

2.8% C
1.0% Si
0.4% Mn
1.8% P
0.5% S to which is added a small amount of manganiferous materials, may be transformed into a superior Thomas or basic pig iron having a temperature of 1550° C. or higher, which is then charged into a converter directly or by the aid of a mixer.

The high working temperature and the fluidity of the basic pig iron produced according to the invention is productive of an economical and commercially desirable process of manufacturing basic steel. The economy in the use of lime and coke in the blast furnace affords a considerable saving in the steel industry. Another advantage of the present invention, affording a considerable saving in industry, resides in the fact that the high temperature of the charged basic pig iron allows a shortened period of blowing in the Thomas converter, thereby leading to smaller losses. Still another economy results from the considerable increase in the quantity of steel turnings or pig iron introduced, in the solid state, as a means of cooling, in the Thomas converter. The high temperature of the iron ore affords a further advantage in the utilization of an iron ore having a lower percentage of phosphorus, such as below 1.4%. The novel process of the instant invention enables the basic steel works to arrest any form of disturbances in the furnace, permits the adoption in the blast furnace of the desired mixture bed suitable to the slag without regard to the requirements of the basic steel works, permits a small consumption of coke, and the presence of a small percentage of iron oxide in the slag.

The charge of iron material for the cupola may be entirely or partially in a granulated form. Similarly thereto, the coke or other cheap fuel may be in the form of small pieces. In lieu of pig iron and/or steel turnings, iron ore, a calcined ore or other forms of iron may be charged into the cupola. The iron material, charged into the cupola may also be entirely or partially in the liquid state.

After melting in the cupola, the pig iron may be submitted to a desulphurization, if necessary, without adversely affecting the pig iron, because the high temperature thereof tolerates a decrease in the temperature of said pig iron.

While the invention has been described with reference to specific embodiments, it will be apparent to those skilled in the art that various modifications may be made and equivalents substituted therefor, without departing from the principles and true nature of the present invention.

What is claimed by Letters Patent is:

1. A process of producing high quality basic Thomas steel, comprising the steps of introducing into a cupola furnace an iron-containing material having a high sulfur content with an excess of carbon; passing a heated fluid containing oxygen into the thus charged cupola furnace while maintaining a reducing atmosphere in the same due to said excess of carbon, thereby melting said iron-containing material having said high sulfur content in a reducing atmosphere in said cupola furnace while preventing formation of iron oxides; passing said molten iron through a molten basic slag in said cupola furnace, said molten basic slag having a temperature exceeding 1400° C. so as to de-sulfurize said iron, thereby obtaining molten basic pig iron having a low sulfur content and being at a temperature exceeding 1400° C.; charging a Thomas converter with said molten basic pig iron having said low sulfur content and being at a temperature exceeding 1400° C.; and subjecting the thus charged molten basic pig iron to treatment in said Thomas converter and recovering a high grade basic Thomas steel.

2. A process of producing high quality basic Thomas steel, comprising the steps of introducing into a cupola furnace an iron-containing material having a high sulfur content with an excess of carbon and with predetermined alloying substances; passing a heated fluid containing oxygen into the thus charged cupola furnace while maintaining a reducing atmosphere in the same due to said excess of carbon, thereby melting said iron-containing material having said high sulfur content in a reducing atmosphere in said cupola furnace while preventing formation of iron oxides; passing said molten iron through a molten basic slag in said cupola furnace, said molten basic slag having a temperature exceeding 1400° C. so as to de-sulfurize said iron, thereby obtaining molten basic pig iron being alloyed with said predetermined alloying substances and having a low sulfur content and being at a temperature exceeding 1400° C.; charging a Thomas converter with said molten basic pig iron having said low sulfur content and being at a temperature exceeding 1400° C.; and subjecting the thus charged molten basic pig iron to treatment in said Thomas converter and recovering a high grade basic Thomas steel.

3. A process of producing high quality basic Thomas steel, comprising the steps of introducing into a cupola furnace an iron-containing material having predetermined contents of carbon, silicon, manganese, phosphorus and having a predetermined high sulfur content with an excess of carbons; adding to the charge a predetermined amount of manganiferous material sufficient to raise the manganese content of said iron to between 0.8–1.2%, the carbon content of said iron being raised to between 3.5–3.8% by the carbon in the charge; passing a heated fluid containing oxygen into the thus charged cupola furnace while maintaining a reducing atmosphere in the same due to said excess of carbon, thereby melting said iron-containing material having said high sulfur content in a reducing atmosphere in said cupola furnace while preventing formation of iron oxides; passing said molten iron through a molten basic slag in said cupola furnace, said molten basic slag having a temperature exceeding 1400° C. so as to de-sulfurize said iron, and reduce the silicon content thereof, thereby obtaining molten basic pig iron having a low sulfur content and being at a temperature exceeding 1400° C.; charging a Thomas converter with said molten basic pig iron having said low sulfur content and being at a temperature exceeding 1400° C.; and subjecting the thus charged molten basic pig iron to treatment in said Thomas converter and recovering a high grade basic Thomas steel.

4. A process of producing high quality basic Thomas steel, comprising the steps of introducing into a cupola furnace an iron-containing material having predetermined contents of carbon, silicon, manganese, phosphorus and having a predetermined high sulfur content with an excess of carbon; adding to the charge predetermined quantities of carbon, manganese and phosphorous sufficient to raise the carbon content, manganese content and phosphorous content of said iron respectively to between 3.5–3.8% carbon, 0.8–½% manganese and 1.7–1.9% phosphorus; passing a heated fluid containing oxygen into the thus charged cupola furnace while maintaining a reducing atmosphere in the same due to said excess of carbon, thereby melting said iron-containing material having said high sulfur content in a reducing atmosphere in said cupola furnace while preventing formation of iron oxides; de-sulfurizing and de-siliconizing said iron to a content of 0.04–0.06% sulfur and 0.2–0.5% silicon by passing said molten iron through a molten basic slag in said cupola furnace, said molten basic slag having a temperature exceeding 1400° C., thereby obtaining molten basic pig iron having predetermined quantities of alloying substances and being at a temperature exceeding 1400° C.; charging a Thomas converter with said molten basic pig iron having said predetermined quantities of alloying metals and being at a temperature exceeding 1400° C.; and subjecting the thus charged molten basic pig iron to treatment in said Thomas converter and recovering a high grade basic Thomas steel.

5. A process of producing high quality basic Thomas steel, comprising the steps of introducing into a cupola furnace having a neutral lining an iron-containing material having a high sulfur content with an excess of carbon; passing a heated fluid containing oxygen at a temperature exceeding about 400° C. into the thus charged cupola furnace while maintaining a reducing atmosphere in the same due to said excess of carbon, thereby melting said iron-containing material having said high sulfur content in a reducing atmosphere in said cupola furnace while preventing formation of iron oxides; passing said molten iron through a molten basic slag in said cupola furnace, said molten basic slag having a temperature exceeding 1400° C. so as to de-sulfurize said iron, thereby obtaining molten basic pig iron having a low sulfur content and being at a temperature exceeding 1400° C.; charging a Thomas converter with said molten basic pig iron having said low sulfur content and being at a temperature exceeding 1400° C.; and subjecting the thus charged molten basic pig iron to treatment in said Thomas converter and recovering a high grade basic Thomas steel.

6. A process of producing high quality basic Thomas steel, comprising the steps of introducing into a cupola furnace having a basic lining an iron-containing material having a high sulfur content with an excess of carbon; passing a heated fluid containing oxygen at a temperature exceeding about 400° C. into the thus charged cupola furnace while maintaining a reducing atmosphere in the same due to said excess of carbon, thereby melting said iron-containing material having said high sulfur content in a reducing atmosphere in said cupola furnace while preventing formation of iron oxides; passing said molten iron through a molten basic slag in said cupola furnace, said molten basic slag having a temperature exceeding 1400° C. so as to de-sulfurize said iron, thereby obtaining molten basic pig iron having a low sulfur content and being at a temperature exceeding 1400° C.; charging a Thomas converter with said molten basic pig iron having said low sulfur content and being at a temperature exceeding 1400° C.; and subjecting the thus charged molten basic pig iron to treatment in said Thomas converter and recovering a high grade basic Thomas steel.

KARL HEIMBERG.

References Cited in the file of this patent

FOREIGN PATENTS

| Number | Country | Date |
|--------|---------|------|
| 11,196 | Great Britain | of 1884 |
| 431,260 | Great Britain | July 1, 1935 |
| 546,020 | Great Britain | June 24, 1942 |